(12) United States Patent
Kuo

(10) Patent No.: US 8,032,110 B2
(45) Date of Patent: Oct. 4, 2011

(54) MOBILE SECURITY DEVICE

(76) Inventor: Chung-Yi Kuo, Taipei Hsien (TW)

( * ) Notice: Subject to any disclaimer, the term of this patent is extended or adjusted under 35 U.S.C. 154(b) by 941 days.

(21) Appl. No.: 11/968,204

(22) Filed: Jan. 2, 2008

(65) Prior Publication Data

US 2009/0170558 A1 Jul. 2, 2009

(51) Int. Cl.
*H04M 11/04* (2006.01)
(52) U.S. Cl. ............... 455/404.1; 455/411; 455/413; 455/466; 455/556.1
(58) Field of Classification Search .......... 455/418–419, 455/466, 556.1–557
See application file for complete search history.

(56) References Cited

U.S. PATENT DOCUMENTS

| 2004/0225425 A1* | 11/2004 | Kindo et al. ............... 701/36 |
| 2008/0086236 A1* | 4/2008 | Saito et al. ............... 700/245 |
| 2008/0151056 A1* | 6/2008 | Ahamefula ............... 348/164 |

* cited by examiner

*Primary Examiner* — Dai A Phuong
(74) *Attorney, Agent, or Firm* — Leong C. Lei

(57) ABSTRACT

The security device contains at least a main unit with a number of wired external sensors and detectors. The main unit itself has built-in image capturing and motion detection capabilities that can be operated independently or to provide additional confirmation to the events detected by the external sensors and detectors. The main unit contains a radio transceiver member capable of conducting two-way, real-time and message-based, mobile communications via a mobile communication network. As such, whenever some abnormality is detected, the main unit is able to dial a specific party to play pre-recorded voice message and/or send captured images or video clips in real time or in some messages.

4 Claims, 4 Drawing Sheets

MOBILE SECURITY DEVICE

TECHNICAL FIELD OF THE INVENTION

The present invention generally relates to devices for security surveillance, and more particularly to such a security device integrated with mobile communication capability.

DESCRIPTION OF THE PRIOR ART

Most of the existing security systems rely on smoke detectors, infrared sensors, and cameras for the detection of abnormality in a monitored environment. The smoke detector is for sensing the smoke produced from fire; the infrared sensor is to detect the body heat of an intruder, and the camera is for recording or monitoring.

When an abnormality is detected, these devices would usually trigger alarms or send out alerts to call for attention. However, these devices conventionally require wire connections such as telephone lines, data lines, etc. For triggering the alarms or sending out the alerts. The laborious wiring of these devices contributes to the high installation and maintenance costs of the conventional security devices. In addition, the wires are often the first target for sabotage. Furthermore, as the alarms and alerts are usually centralized for the convenience of monitoring, a user of these devices cannot be alarmed or alerted if he or she is away from the centralized location.

SUMMARY OF THE INVENTION

Accordingly, a novel security device with mobile communication capability is provided herein to obviate the shortcomings of the conventional security devices.

The security device contains at least a main unit with a number of wired external sensors and detectors. The main unit itself has built-in image capturing and motion detection capabilities that can be operated independently or to provide additional confirmation to the events detected by the external sensors and detectors.

Most importantly, the main unit contains a radio transceiver member capable of conducting two-way, real-time and message-based, mobile communications via a mobile communication network. As such, whenever some abnormality is detected, the main unit is able to dial a specific party to play pre-recorded voice message and/or send captured images or video clips in real time or in some messages. On the other hand, the main unit can be triggered by a remote controller or by an incoming call or short message through the mobile communication network to send captured images or video clips in real time or in some messages.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
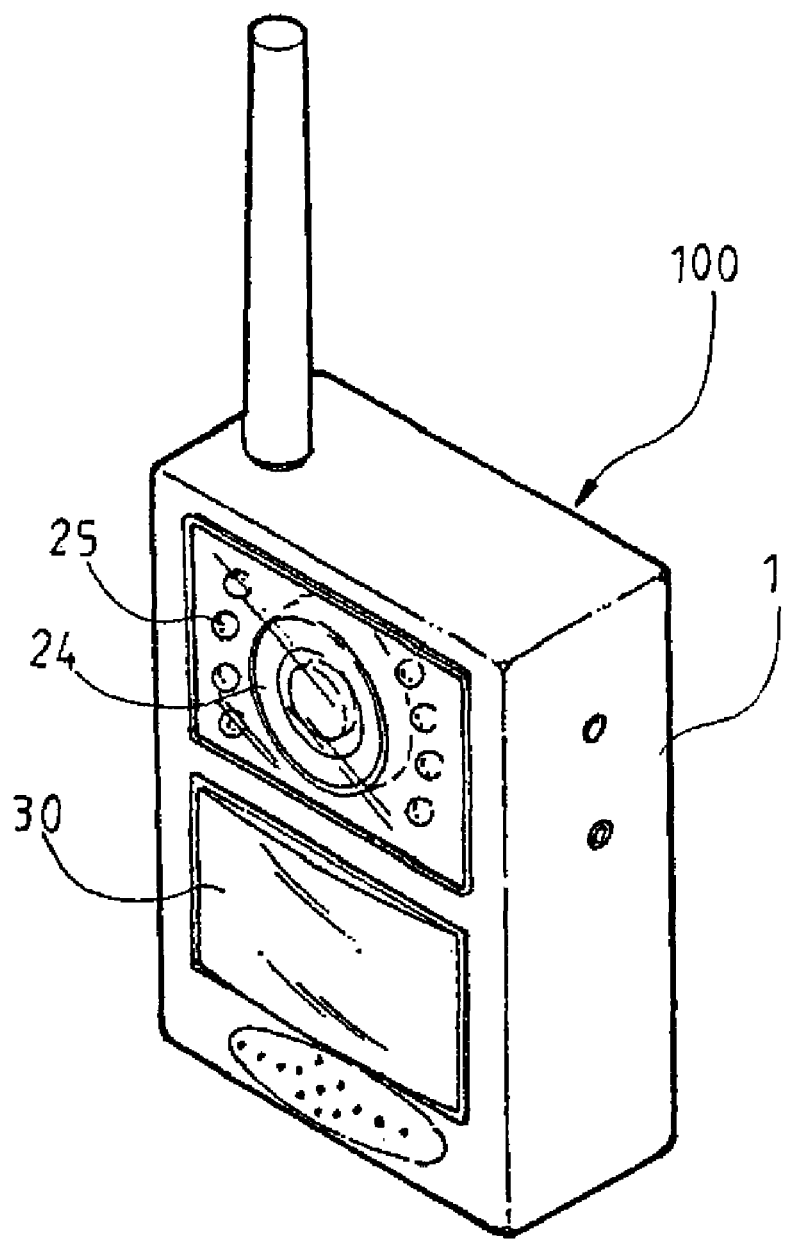
FIG. 1 is a schematic diagram showing the main unit of a security device according to an embodiment of the present invention.

As shown in FIG. 1, a security device 100 according to an embodiment of the present invention has a microprocessor-based stand-alone main unit 1. On a front side of the main unit 1, there is an image capturing member 24 and a heat-sensing motion detection member 30. To compensate insufficient lighting in the monitored environment, a number of infrared light emitting diodes (LEDs) 25 are positioned regularly around the image capturing member 24. On a bottom side of the man unit 1, there are a number of connectors (not shown).

Figure 2:
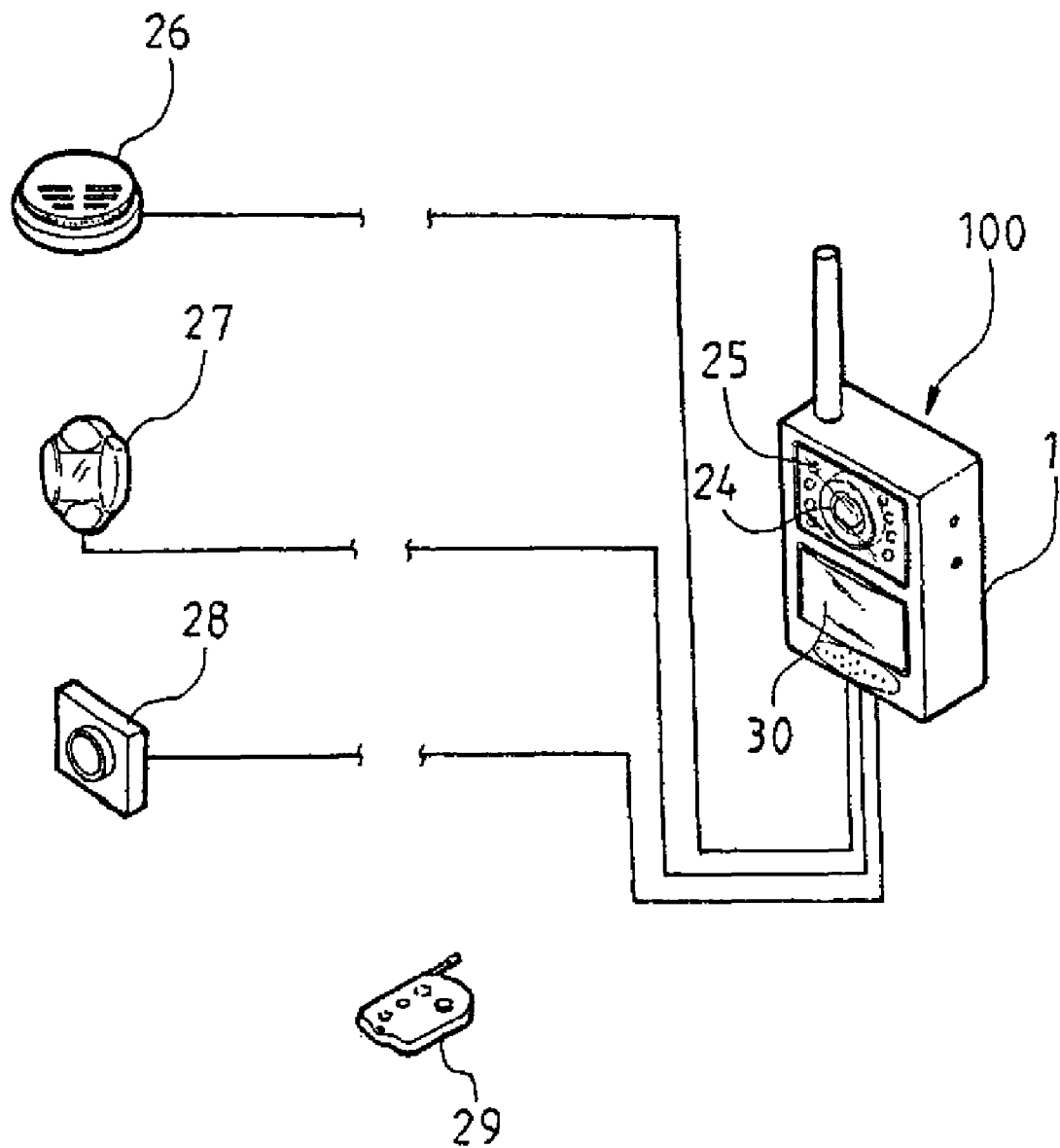
FIG. 2 is a schematic diagram showing the connections of the main unit of FIG. 1 to a number of external devices.

As shown in FIG. 2, the connectors of the main unit 1 is for connecting and receiving signals from external devices such as a smoke detector 26, a heat-sensing motion detector 27, and one or more infrared cameras 28. The security device 100 may further contain a remote controller 29 for controlling the operation of the security device 100 from a limited distance.

To use the security device 100, the main unit 1 and the external devices such as the smoke detector 26, the heat-sensing motion detector 27, and the infrared cameras 28 are installed on the walls and/or ceilings of an monitored environment and the image capturing member 24 and/or the infrared cameras 28 are adjusted to aim at appropriate locations of the monitored environment.

Figure 3:
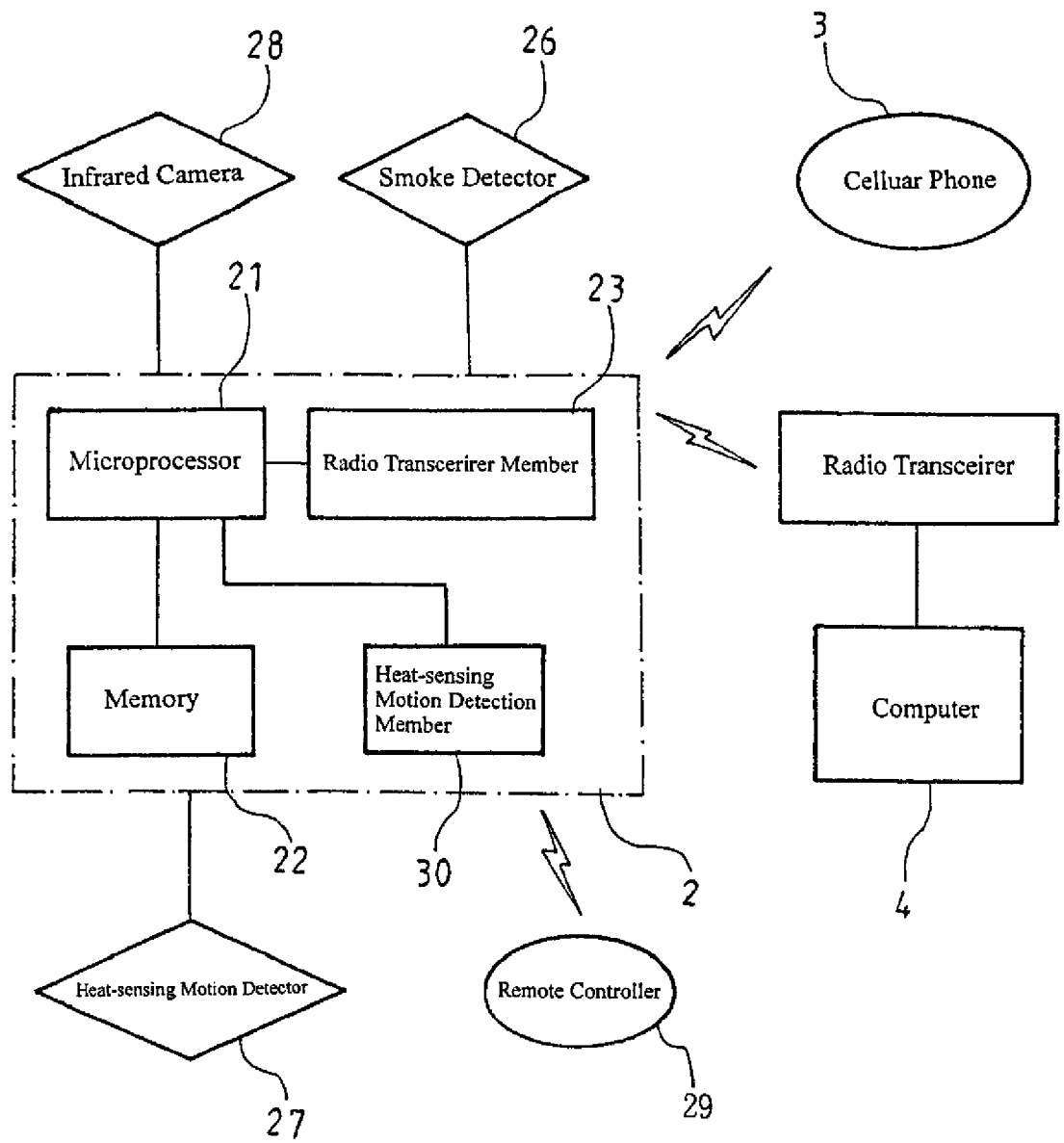
FIG. 3 is a schematic diagram showing the various functional blocks of the security device of the present invention.

As shown in FIG. 3, a control circuit 2 is housed inside the main unit 1 and is electrically and signally connected to the built-in image capturing member 24 (not shown) and the heat-sensing motion detection member 30.

The control circuit 2 is also at least signally connected to the smoke detector 26, the heat-sensing motion detector 27, and the infrared cameras 28 via the connectors of the main unit 1.

The control circuit 2 has a conventional computing architecture with a microprocessor 21, memory 22, etc. The control circuit 2 further contains a radio transceiver member 23 capable of conducting two-way, real-time and message-based communications via a mobile communication network. The remote controller 29 therefore actually interacts with the control circuit 2 of the main unit 1.

Figure 4:
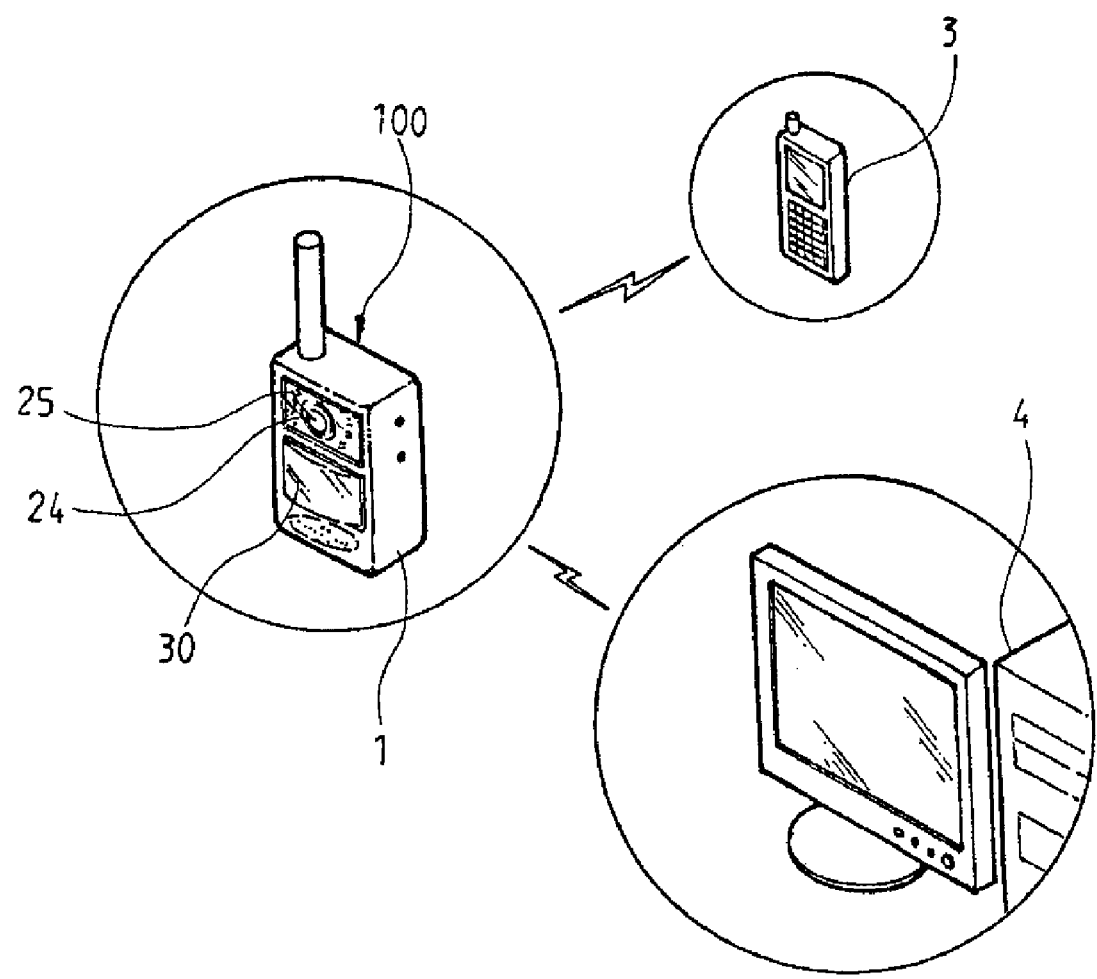
FIG. 4 is a schematic diagram showing an application scenario of the security device of the present invention.

As shown in FIG. 4, whenever the smoke detector 24 senses smokes, the heat-sensing motion detection member 30 or the heat-sensing motion detector 27 detects the body heat of an intruder (double-confirmed by the image capturing member 24 or the infrared camera 28 which detects object moving by comparing the captured images), the control circuit 2 is triggered to automatically dial repeatedly a preset number stored in the control circuit 2 via the radio transceiver member 23 and a mobile communication network (not shown). When the call is answered, the control circuit 2 is able to play a pre-recorded voice message also stored in the control circuit 2 to the answered party to report the detected abnormality. Additionally, if the called party is answered with a cellular phone 3 with appropriate video playing capability, the control circuit 2 is able to send captured images or video clips by the image capturing member 24 or the infrared camera 28 to the cellular phone 3 for display in real-time so that the called party can see what has happened in the monitored environment. Additionally or simultaneously, the captured images or video clips can also be sent to a preset email box (whose email address is also stored in the control circuit 2) which can be retrieved and viewed later by a computer 4.

On the other hand, a user can also remotely and proactively request the security device 100 to "report" the current situation of the monitored environment. For example, the radio transceiver member 23 of the main unit has a SIM card and therefore has a mobile number assigned to it. A user can dial the mobile number and the control circuit 2 can verify to see if the calling number matches a preset authorization number stored in the control circuit 2. If the calling party is authenticated as such, the control circuit 2 hangs up the call and send captured images or video clips to the designated destination as described earlier. Similarly, the user can also trigger the security device's report by sending a SMS or MMS message to the control circuit 2. The short message can be authenticated as described above and some instructions about what to report and where to send the images or video clips can be contained in the message. The control circuit 2 then can respond in accordance with the instructions of the message. Please note at the radio transceiver member 23 should support the mobile communication protocols, currently existing ones such as GPRS, SMS, MMS, or those that will be developed in the future, in order to achieve the foregoing functionalities.

The remote controller 29 can also allow a local user, such as a senior citizen living alone, to trigger the security device 100 to send out alarms or alerts as described above when he or she has encountered some emergency or difficulty. Once triggered in his way, the control circuit 2 will again call the designated party and/or send out captured images or video clips.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A mobile security device comprising:
    a microprocessor-based main unit having an image capturing member, a heat-sensing motion detection member, and a control circuit electrically and signally connected to said image capturing member and said heat-sensing motion detection member, said control unit having a microprocessor, a memory and a radio transceiver member, said radio transceiver member being capable of conducting two-way, real-time and message-based communications via a mobile communication network, said radio transceiver member having a SIM card and having a mobile number assigned to said SIM card;
    an infrared camera signally connected to said control circuit of said main unit and capable of sending captured images to said control circuit;
    a smoke detector signally connected to said control circuit, said smoke detector triggering said control circuit when sensing smokes; and
    a heat-sensing motion detector signally connected to said control circuit, said heat-sensing motion detector triggering said control circuit when sensing presence of a warm object;
    a remote controller capable of interacting with said control circuit;
    wherein when said smoke detector senses smokes, said heat-sensing motion detection member or said heat-sensing motion detector detects body heat of an intruder, said image capturing member or said infrared camera which detects object moving by comparing captured images will double confirm whether there is smokes or an intruder, then said control circuit is triggered to make phone calls by automatically dialing repeatedly a present number stored in said control circuit via said radio transceiver member and a mobile communication network, and when said phone calls are answered, said control circuit will play a pre-recorded voice message stored in said control circuit to an answered party to report detected abnormality; if called party is answered with a cellular phone with video playing capability, said control circuit will send captured images or video clips by said image capturing member of said infrared camera to said cellular phone for display in real-time so that the called party can see what has happened in monitored environment, and the captured image will be simultaneously sent to a preset email box which email address is stored in said control circuit;
    wherein when a user makes a call by dialing said mobile number or, or send a SMS or MMS message to said mobile number, said control circuit will verify to see if calling number matches a preset authorization number stored in said control circuit; if said user is authenticated, said control circuit will hang up said call and send captured images or video clips to designated destination thereby reporting current situation of said monitored environment.

2. The mobile security device as claimed in claim 1, wherein a plurality of infrared light emitting diodes are positioned regularly around said image capturing member.

3. The mobile security device as claimed in claim 1, wherein said radio transceiver member is capable of supporting at least GPRS, SMS and MMS protocols.

4. The mobile security device according to claim 1, wherein said main unit further comprises a plurality of connectors for connecting said smoke detector, said heat-sensing motion detector, and said infrared camera.

\* \* \* \* \*